(12) United States Patent
Eberbach et al.

(10) Patent No.: US 7,878,384 B2
(45) Date of Patent: Feb. 1, 2011

(54) ULTRASONIC WELDING DEVICE WITH OPPOSITE WELDING AND LATERAL SURFACES THAT DELIMIT A COMPRESSION SPACE, AND COMPRESSION SPACE

(75) Inventors: Jost Eberbach, Buseck (DE); Dieter Stroh, Wettenberg (DE); Horst Dieterle, Niederweimar (DE); Heiko Stroh, Wettenberg (DE)

(73) Assignee: Schunk Ultaschalltechnik GmbH, Wettenberg (DE)

( * ) Notice: Subject to any disclaimer, the term of this patent is extended or adjusted under 35 U.S.C. 154(b) by 692 days.

(21) Appl. No.: 11/815,123

(22) PCT Filed: Feb. 1, 2006

(86) PCT No.: PCT/EP2006/000870

§ 371 (c)(1), (2), (4) Date: Oct. 9, 2007

(87) PCT Pub. No.: WO2006/082037

PCT Pub. Date: Aug. 10, 2006

(65) Prior Publication Data

US 2008/0128471 A1 Jun. 5, 2008

(30) Foreign Application Priority Data

Feb. 2, 2005 (DE) .................. 10 2005 004 899

(51) Int. Cl.
*B23K 1/06* (2006.01)
*B29C 65/08* (2006.01)

(52) U.S. Cl. ............ 228/1.1; 228/110.1; 156/580.2

(58) Field of Classification Search ............ None
See application file for complete search history.

(56) References Cited

U.S. PATENT DOCUMENTS

| 4,596,352 | A | | 6/1986 | Knapp |
| 4,646,957 | A | | 3/1987 | Nuss |
| 4,799,614 | A | * | 1/1989 | Welter et al. .................. 228/1.1 |
| 4,826,067 | A | * | 5/1989 | Butler .......................... 228/1.1 |
| 4,852,788 | A | * | 8/1989 | Patrikios .................. 228/110.1 |
| 4,867,370 | A | * | 9/1989 | Welter et al. ............. 228/110.1 |
| 4,869,419 | A | * | 9/1989 | Nuss ........................ 228/110.1 |
| 5,941,443 | A | * | 8/1999 | Steiner et al. .................. 228/1.1 |
| 6,089,438 | A | * | 7/2000 | Suzuki et al. ................. 228/1.1 |
| 6,158,645 | A | | 12/2000 | Sakamoto |
| 6,299,052 | B1 | * | 10/2001 | Wnek et al. ............... 228/110.1 |
| 6,523,732 | B1 | * | 2/2003 | Popoola et al. ............. 228/1.1 |
| 7,459,653 | B2 | * | 12/2008 | Steiner et al. ................. 219/56 |
| 2002/0000459 | A1 | * | 1/2002 | Wnek et al. .................. 228/1.1 |

(Continued)

FOREIGN PATENT DOCUMENTS

CH 525755 7/1972

(Continued)

*Primary Examiner*—Kiley Stoner
(74) *Attorney, Agent, or Firm*—Dennison, Schultz & MacDonald

(57) ABSTRACT

An ultrasound welding device for welding metallic conductors for producing a junction point includes two welding surfaces, which are located on opposite sides, and two lateral delimiting surfaces, which extend transverse to the working surfaces and which, together, define a compression space. In order to eliminate longitudinal movement of the conductors during welding, at least one of the lateral delimitation surfaces is additionally structured next to the structured welding surfaces.

29 Claims, 6 Drawing Sheets

U.S. PATENT DOCUMENTS

Figure 1:
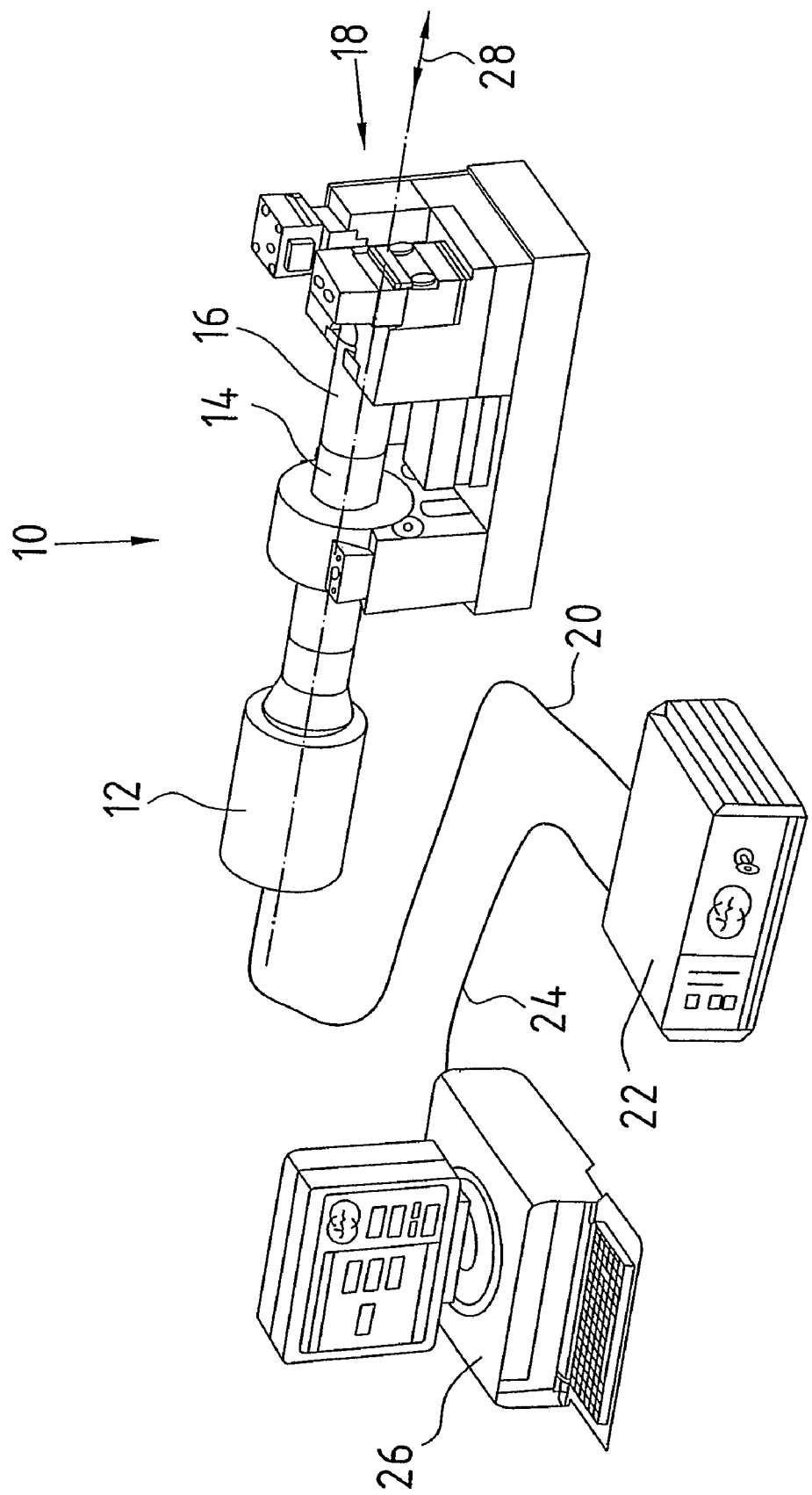

| | | |
|---|---|---|
| 2002/0130159 A1 | 9/2002 | Kondo |
| 2004/0088857 A1* | 5/2004 | Fujimoto et al. ............... 29/871 |
| 2004/0178249 A1* | 9/2004 | Gordon, Jr. ............... 228/110.1 |
| 2005/0199676 A1* | 9/2005 | Stroh et al. ................... 228/1.1 |
| 2006/0283912 A1* | 12/2006 | Eberach ....................... 228/101 |
| 2007/0257088 A1* | 11/2007 | Steiner et al. ............ 228/110.1 |
| 2008/0032569 A1* | 2/2008 | Steiner et al. ............... 439/874 |
| 2008/0190993 A1* | 8/2008 | Delsman et al. .......... 228/110.1 |

FOREIGN PATENT DOCUMENTS

| | | |
|---|---|---|
| DE | 4129633 | 5/1992 |
| GB | 2012211 | 7/1979 |
| JP | 60201928 | 10/1985 |
| JP | 7-183339 A * | 7/1995 |

* cited by examiner

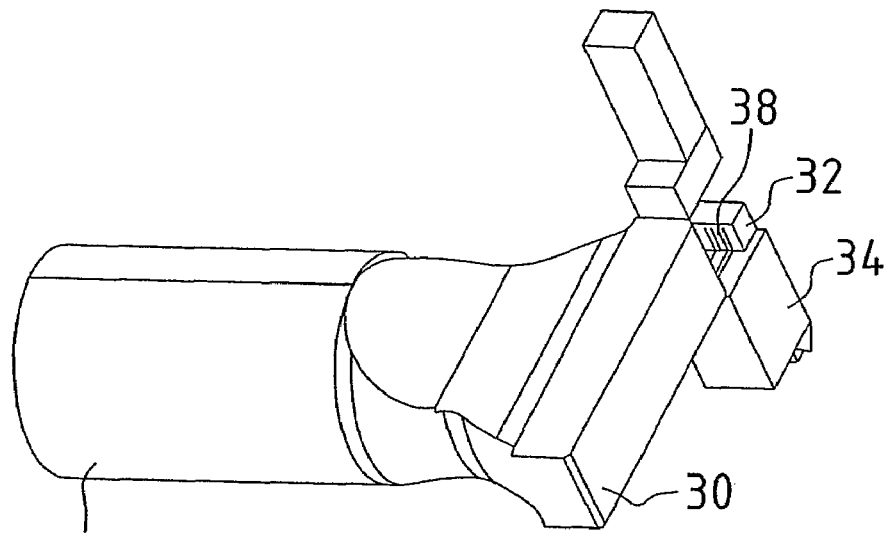
Fig.4
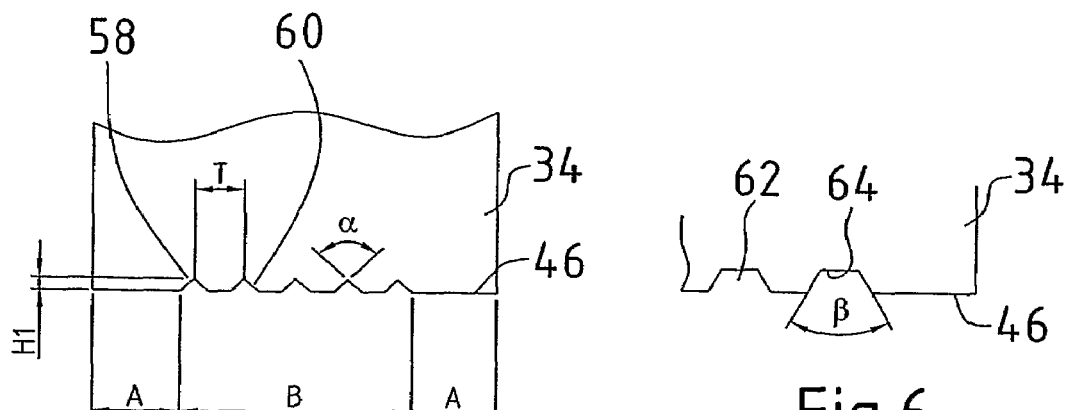
Fig.5
Fig.6
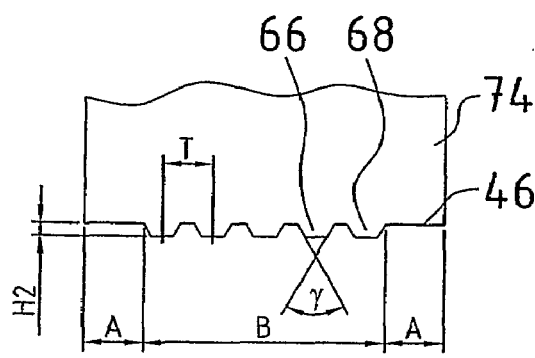
Fig.7
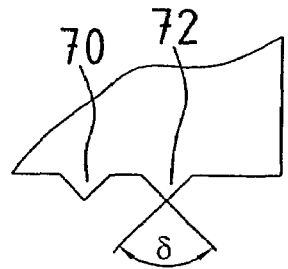
Fig.8

ULTRASONIC WELDING DEVICE WITH OPPOSITE WELDING AND LATERAL SURFACES THAT DELIMIT A COMPRESSION SPACE, AND COMPRESSION SPACE

The present invention relates to a compression space of an ultrasonic welding apparatus for the welding of metal conductors such as stranded wires, particularly for the manufacturing of a junction, including two work areas defining the compression space on their opposite side faces, and two side-delimiting areas running transversally in relation to the work areas, whereby one work area is a section of a sonotrode of the ultrasonic welding apparatus, which can be placed in ultrasonic oscillation, and the opposite work area is a part of a counter electrode, and the work areas are structured. The present invention relates furthermore to a tool in form of a side slide or the carrier of a counter electrode of an ultrasonic welding apparatus with sonotrode, whereby the tool with one area as side-delimiting area is delimited as a compression space and, delimitations of the compression space running transversely toward the side-delimiting area are formed by a work area of the sonotrode and a work area of the counter electrode.

Plastic materials as well as metals can be welded by means of ultrasound. In the ultrasonic welding of metals, the mechanical oscillations are aligned parallel to the welded joint surface. A complex relation is formed between the static force, the oscillation shearing forces and a moderate increase in temperature in the welding area. For this purpose, the work pieces are positioned between the oscillating sonotrode and a static counter electrode, which is, if need be, adjustable in relation to the sonotrode, and which can be designed in multiple parts to limit a compression space with the sonotrode, i.e. work area of its head. According to the theories of EP-B-0 143 936 or DE-C-35 08 122, this can be configured to be adjustable in two directions running perpendicular to each other, particularly height and width.

This will result in an adjustment to cross sections of conductors that are to be welded, for example.

In the known compression space, which essentially has a rectangular cross section, the stranded wires, which penetrate the compression space in its open sides, are welded to transit nodes or end nodes by means of ultrasound. Conductors that are hard to weld present the disadvantage that the stranded wires are moved in their longitudinal direction during welding so that they protrude past the junction. In order to reduce this longitudinal movement, the energy input and/or the pressure application is reduced in comparison to stranded wires that are more easily weldable during the welding process. This, however, can cause a reduction in strength.

The present invention is based upon the object of developing a compression space and/or tool, which delimits such compression space in such manner that even in poorly weldable conductors, a proper quality can be achieved, whereby a moving of the conductors by, for example, high energy input and/or pressure application, can be eliminated.

To accomplish this objective, the present invention essentially provides that at least one of the side-delimiting areas, preferably both side-delimiting areas, are structured at least areally. In this connection, the structures are selected in such manner that they run essentially across the longitudinal axis of the compression space, that is in the direction of the longitudinal axis of the conductors to be welded, whereby a longitudinal movement of the conductors can be eliminated so that common and/or increased energy levels or pressures can be applied for welding without negatively effecting the quality of the welded joint.

It is in particular provided that at least one delimiting area has a structure and/or profiling, which is formed by depressions and/or elevations that run across the longitudinal axis of the compression space. The depressions in this are set back in relation to the plane formed by the delimiting area. The elevations correspondingly project over the plane.

If it is possible to distribute the structure evenly throughout the delimiting area, a further development of the present invention provides that the delimiting area is only structured areally. The structure can be particularly subdivided into groups that are positioned at a distance from each other. The delimiting areas can be formed evenly within the intermediate areas. The structure groups can also merge, whereby the structure of one group may be different from the structure of another group.

It is particularly provided that the structure is formed by saw tooth-shaped elevations, whereby two groups of saw tooth-shaped elevations can be provided such that during interaction with the conductors to be welded, quasi-delimiting areas with hooks are created that eliminate a moving of the conductors to be welded.

Another proposal provides that the counter electrode originates from a carrier running along a side of the sonotrode and vertically or nearly vertically in relation to the work area of the sonotrode, and its side facing the compression space is a side-delimiting area, or one from which preferably a plate-shaped element originates, which has a delimiting area on the outside, and that the structure of the delimiting area is also formed to supplement the structure of the side of the sonotrode. This results in a quasi labyrinth-type seal between the sliding areas with the result that during the moving of the counter electrode in the direction of the sonotrode, the stranded wires cannot enter into the slot, which runs between the areas.

The structure is preferably formed of line- or groove-type depressions and/or of respectively continuing corrugated elevations or protrusions, which, for example, in particular have a cross section of a triangle, a trapezoid or a segment of a circle. There is also the possibility to construct the elevations and/or depressions in a wavelike section.

The underlying object of the present invention is also resolved in that the tool, which has a side-delimiting area, is structured, whereby preferably it is provided that the structure and/or profiling is pronounced across the longitudinal direction in relation to the compression space, which is limited by the side-delimiting area.

It is particularly provided that the elevations protrude past the plane formed by the side-delimiting area and/or the depressions run set back in relation to the plane. Saw tooth-shaped geometric profilings are possible as elevations, whereby the elevations are preferably divided into two groups, which have edges that are positioned towards each other.

Apart from this, the corrugated elevations and/or channel-like depressions can preferably have a cross section of a triangle, a trapezoid or a segment of a circle. Other suitable geometric profilings, which ensure that a moving of the stranded wires to be welded is eliminated, are also possible.

The structure and/or profiling provided in the side areas can also be provided in the work- and/or welding areas of the sonotrode and/or of the anvil.

In order to avoid that during welding the sonotrode is strongly deflected vertically in relation to its longitudinal axis, which could lead to a gap between the work area continuing from the sonotrode and the parts to be welded, it is intended that the abutting face of the sonotrode and/or back of a sonotrode head, which has a work area, has at least one bracing, such as a corrugation. In this connection, the bracing can have a triangular geometric section in the direction of the longitudinal axis of the sonotrode.

Preferably, the bracing protrudes from the circumferential margin of the abutting face and/or the workspace of the sonotrode in the direction of the longitudinal axis of the sonotrode increasingly beyond the abutting face. Here the bracing can in particular run vertically to the workspace.

If there exists the possibility that the bracing protrudes beyond the entire or almost the entire abutting face of the sonotrode, it is also possible that the bracing, which prevents an unwanted flexing of the sonotrode, is formed sectionally while preferably originating from the abutting section of the sonotrode as well as protruding from it.

The bracing can be constructed as a line or bulb-like. The bracing is in particular shaped symmetrically relative to a plane, where the longitudinal axis of the sonotrode runs.

Independently thereof, the sonotrode should be stiffened in such manner that a generation of ultrasound results in a deflection in the direction of the longitudinal axis $A_Z$ and vertically to the work area a deflection $A_Y$ with the relation of $3 \leq A_Z/A_Y \leq 20$.

Geometrically favorable conditions are achieved in particular when the maximum length of the bracing above the abutting face is within 3 mm and 25 mm, in the preferred version between 5 mm and 15 m.

Figure 3:
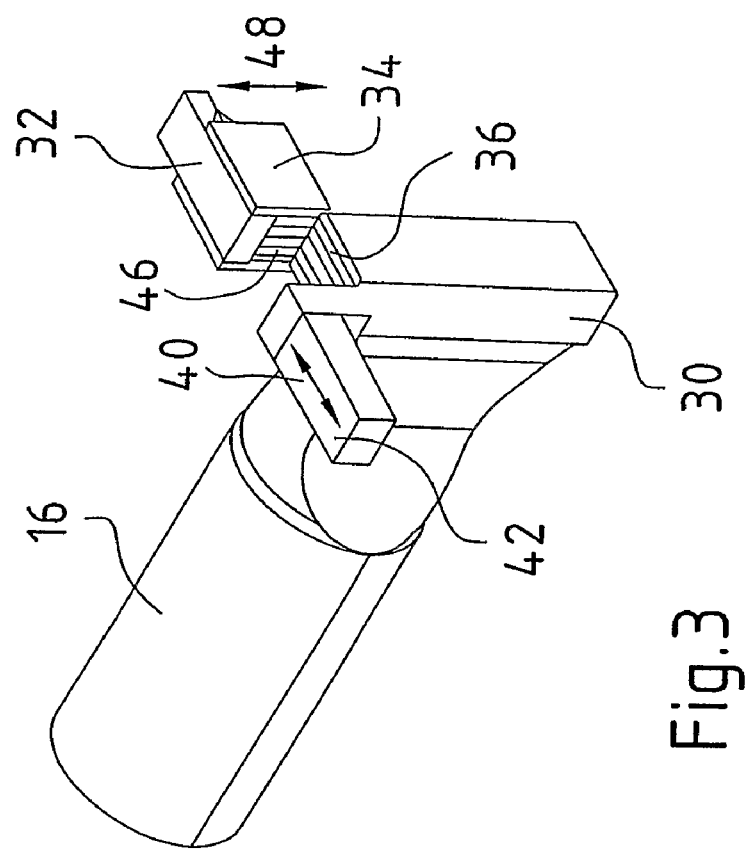
Figure 2:
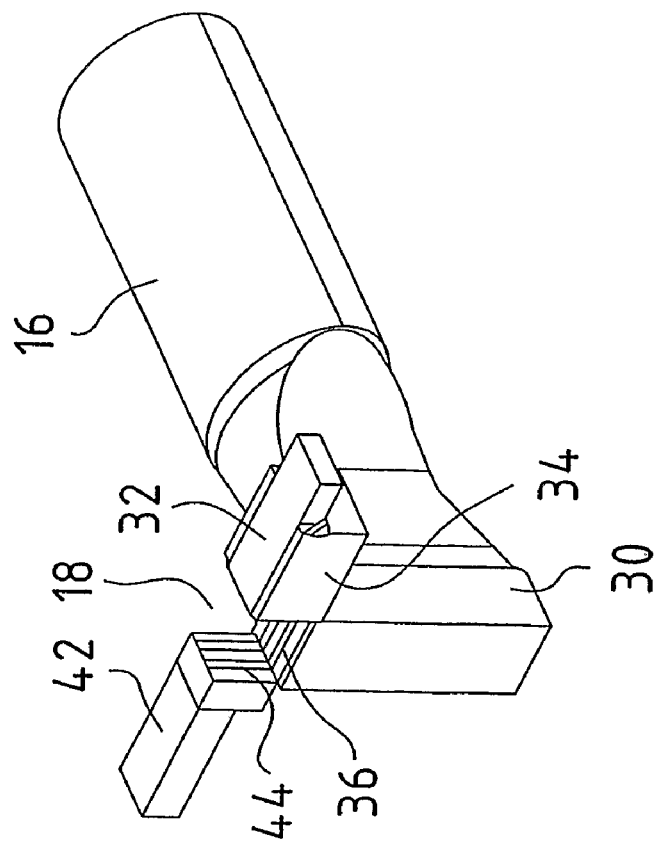
Figure 9:
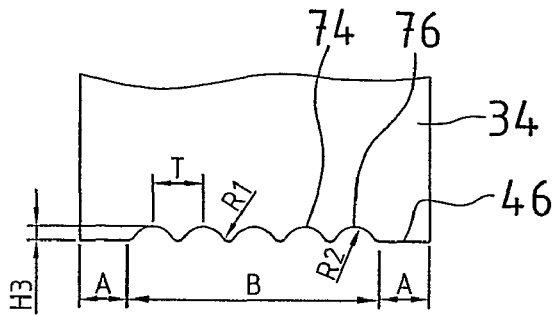
Figure 10:
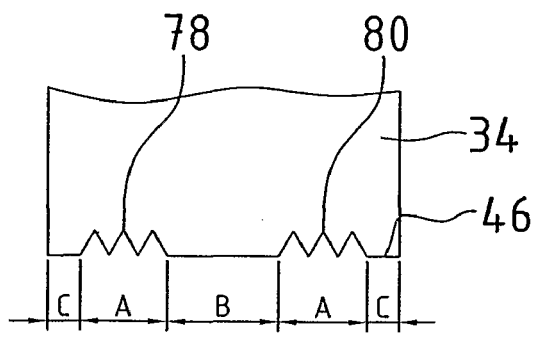
Figure 11:
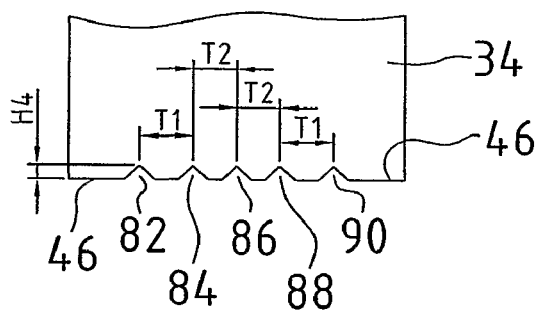
Figure 12:
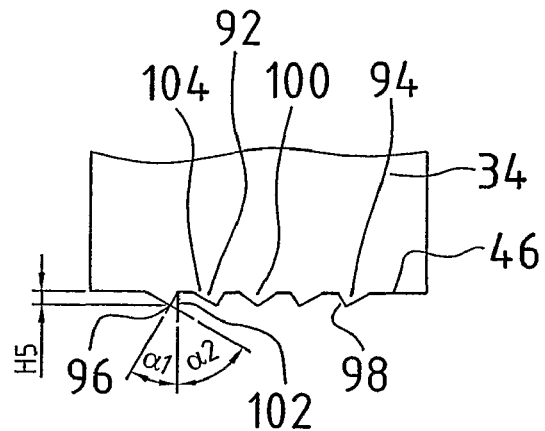
Figure 13:
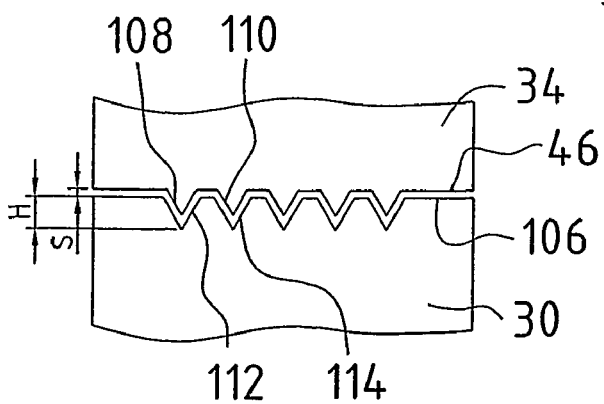
Figure 14:
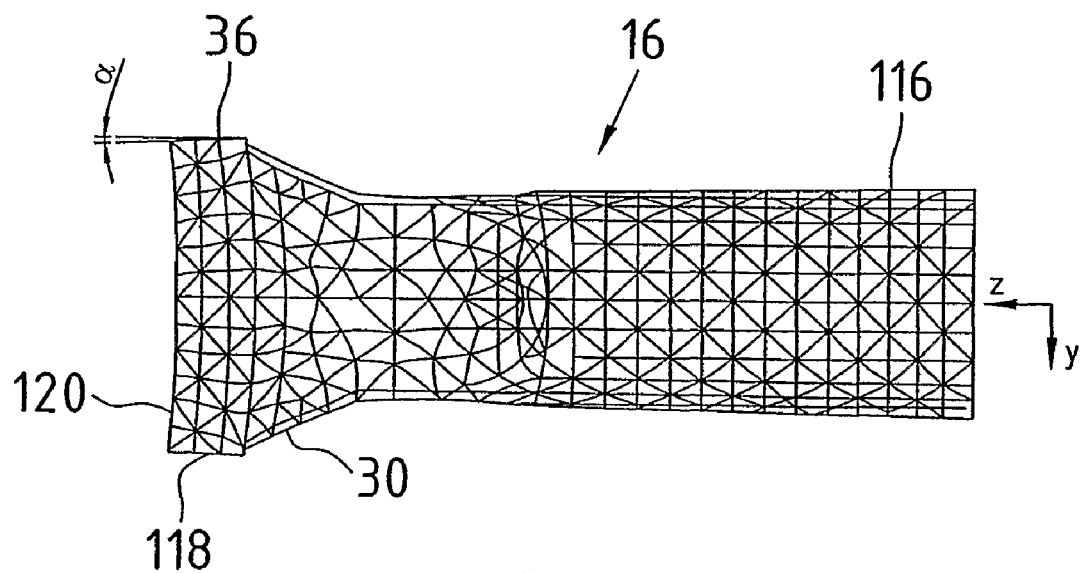
Figure 15:
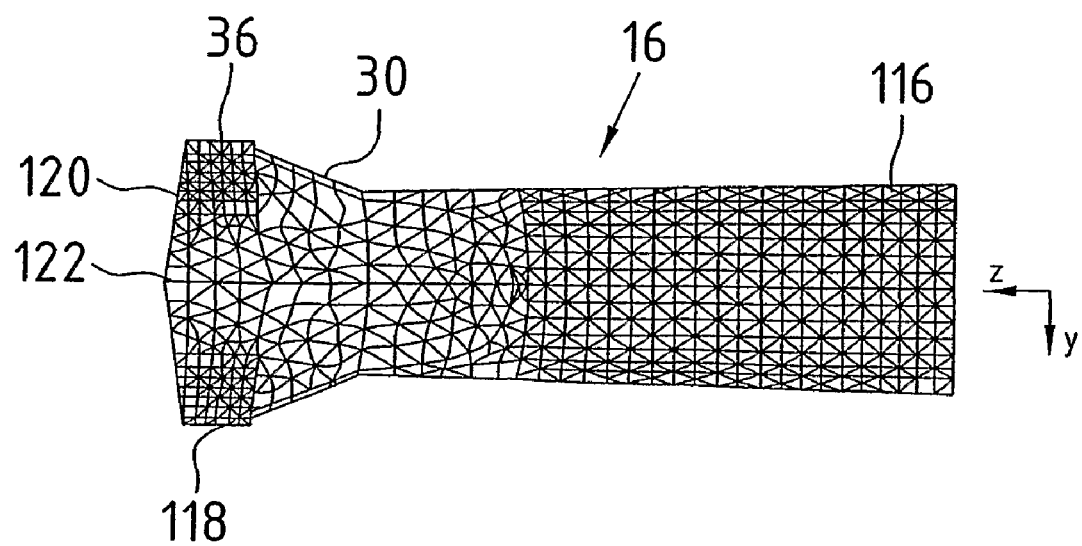
Figure 16:
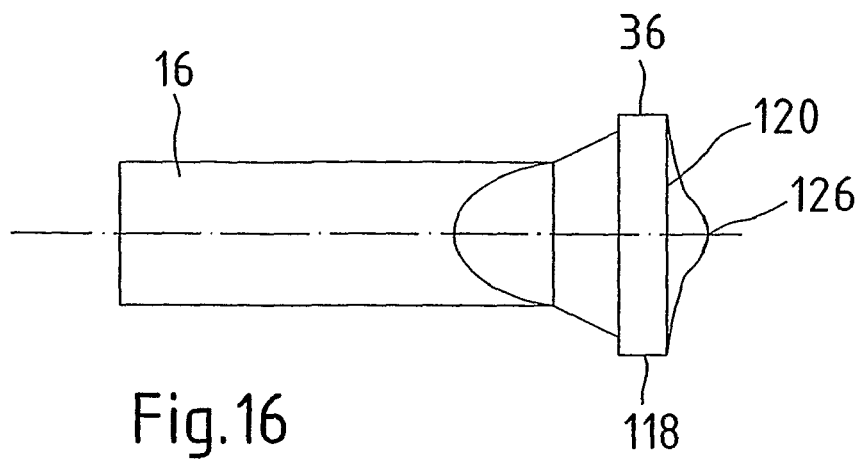
Figures 17, 18:
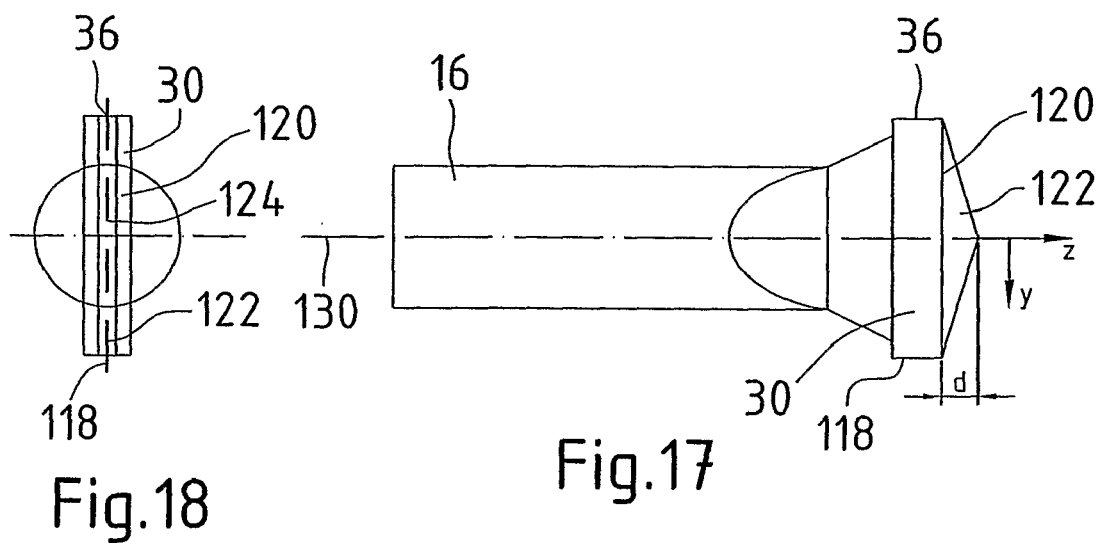
Figure 19:
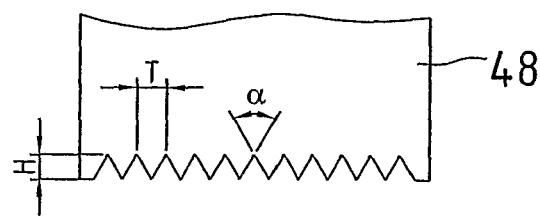

Additional details, advantages and characteristics of the present invention are not only found in the claims, the features to be inferred from them (individually and/or in combination) but also in the following description of the preferred embodiments to be inferred from the drawings, wherein:

FIG. 1 is basic diagram of an ultrasonic welding apparatus,

FIG. 2-4 represent various perspective illustrations of elements enclosed by a compression space, FIG. 5 illustrates a cross section of a delimiting element, FIG. 6 is an alternative design of a delimiting element according to a section of FIG. 5, FIG. 7 is a sectional representation of another embodiment of a delimiting element, FIG. 8 is an enlarged representation of an alternative embodiment for FIG. 7, FIG. 9 is a cross-sectional representation of a third embodiment of a delimiting element, FIG. 10 is a fourth embodiment of a delimiting element in section, FIG. 11 is a fifth embodiment of a delimiting element in section, FIG. 12 is a sixth embodiment of a delimiting element in section, FIG. 13 is another embodiment of a delimiting element with a section of a sonotrode in section, FIG. 14 is a basic diagram (final element calculation) of a sonotrode, FIG. 15 is basic diagram (final element calculation) of a sonotrode design, FIG. 16 is a special embodiment of a sonotrode, FIG. 17 is a further embodiment of a sonotrode, FIG. 18 is a frontal view of the sonotrode according to FIG. 17 and FIG. 19 is a further embodiment of a delimiting element.

FIG. 1 shows an ultrasonic welding arrangement purely in outline, which is used to weld metal components in form of stranded wires to each other, to mention an example for a preferred use.

The ultrasonic welding apparatus includes an oscillator 10, which consists in the embodiment of a converter 12, a booster 14 and a sonotrode 16. The sonotrode delimits a compression space 18, which is to be described in the following. A basic design of a respective compression space can, for example, be found in U.S. Pat. No. 4,869,419.

As is well known, the converter 12 is connected through a line 20 to a generator 22, which on its part is connected through a line 24 to a processor 26, which controls a generator 22, and to convert electrical into mechanical resonances by means of a converter 12 through piezo-elements, for example, whereby the resonances are amplified through the booster 14 and to then stimulate the sonotrode 16 accordingly.

In order to be able to weld poorly weldable conductors such as stranded wires into junctures of sufficient quality in the compression space 18, which in a cross section is rectangular and has open sides, without the risk that the conductors wander in the longitudinal direction of the compression space penetrating the side faces during welding (thus in the direction of arrow 18), it is provided in accordance with the present invention that the compression space 18 is structured into at least three delimitation areas, preferably in all four delimitation areas. This follows from FIG. 2 through 4. The sonotrode 16 with sonotrode head 30 is thus represented purely in outline and in perspective representation, to which an anvil to be designated as a counter electrode 32 is assigned, which originates from a carrier 34 that is adjustable along the sonotrode head 30. A construction has thus far been selected, which is shown by way of example in U.S. Pat. No. 4,869,419.

In other words, the compression space 18 is delimited by a work area or welding area 36 of the sonotrode head 30 and an opposite work area or welding area 38 of the anvil 32, which are respectively structured.

In order to be able to adjust the compression space 18 both in height as well as in width, an adjustable side slide 42 runs adjustable in the direction of arrow 40 in the embodiment across the welding areas 36, 38 with the side delimiting area 44, which is structured according to the invention. The opposite side-delimiting area 46, which is formed by the carrier 34 of the anvil 32 or by a plate element that originates from carrier 34, is also structured. Special geometric shapes of the particular structures of the side-delimiting areas 44, 46 are shown in FIG. 5 through 13.

In order to adjust the compression space 18 according to the cross section of the conductor to be welded, not only the side slide 42 must be adjusted in the direction of arrow 40, but also the carrier 34 must be adjusted along the sonotrode head 30, that is along the arrow 48, whereby the distance is adjusted between the work areas 36, 38 of sonotrode head 30 and anvil 32.

When welding stranded wires, in order to avoid their moving in their longitudinal direction, i.e. move out of the compression space 18, not only the welding areas 36 and 38 are structured according to the present invention, as already mentioned, but also the side-delimiting areas 44, 46.

If preferably each side-delimiting area 44, 46 is structured, it is easily possible that only one of the areas 44 or 46, respectively, will have that particular structure. The structure 44, 46 should, however, run independently hereof across the longitudinal direction (arrow 28) of the compression space 18, that is across the longitudinal axis of the conductor to be welded.

Preferred structures can be determined, for example, on the basis of a sectional illustration of the carrier 34, which receives the anvil 32, accordingly marked in FIG. 5 with 13 with the reference number 34. The side slide 42, e.g. its delimiting area 44, also shows corresponding structures.

The carrier 34 according to FIG. 5 has at its side-delimiting area 46 three areas A, B, C, which run parallel to each other, are strip-shaped and run along the double arrow 48 in FIG. 3. The outer areas A have the same width, whereby the median area B is designed to be wider.

Compared to the plane set by the side-delimiting area 46, the median area B has depressions 58, 60, which are set back and channel-like, and which are positioned parallel to each other and run parallel or about parallel to the direction of carrier 34 and therefore vertical or nearly vertical in relation to the welding- or work areas 36, 38 of the sonotrode head 30 and/or the anvil 32.

In the embodiment of FIG. 5, the channel-like or furrow-like depressions 58, 60 are positioned to run in a distance T and generally have a triangular geometry, whereby the arms include an angle $\alpha$ with $30° \leq \alpha \leq 120°$. The distance T is preferably equal to $0.4 \text{ mm} \leq T \leq 3.0 \text{ mm}$.

The depth H of the depressions, which can also be denoted as depressions, is for instance $0.03 \text{ mm} \leq H1 \leq 0.5 \text{ mm}$.

According to FIG. 6, there is the alternative to design the channel-like depression 62, 64 that generally the trapezoid-shaped profiling is created, whereby the cross arms are positioned in an angle of $30° \leq \beta \leq 120°$.

If, according to FIGS. 5 and 6, the profiling and/or structure of the side-delimiting area 46 of the carrier 34 is formed by depressions, then, according to the illustrations in FIGS. 7 and 8, there is also the possibility to form a particular structure with elevations 66, 68, which can generally have a trapezoid-like geometry (FIG. 7) or triangular geometry (FIG. 8). The particular elevations 66, 68 and/or 70, 72 protrude with a measure H2 of $0.03 \text{ mm} \leq H2 \leq 0.5 \text{ mm}$ beyond the plane, which is created by side-delimiting area 52. The side arms of the protrusions 66, 68 and/or 70, 72 therein include an angle $\gamma$ (FIG. 7) of $30° \leq \gamma \leq 120°$ and/or $\delta$ (FIG. 8) of $30° \leq \delta \leq 120°$.

If in the embodiments of FIG. 5-8, the profiling is only designed in one area of the side-delimiting area 46, rather in area B than in the peripheral areas A, then the structure can also run in another area of side-delimiting area 46.

According to the illustrations of FIG. 9, there exists the possibility of selecting the area B, where a structure is provided within, wider than in the embodiment of FIG. 5 through 8. The structured median area B—as shown in a comparison of FIG. 5 through 8 as well as in FIG. 9—is substantially wider than the peripheral areas A.

The profiling and/or structure of the side-delimiting area 46 according to FIG. 9 is formed by channel-like depressions 74, 76 or channels which run opposite of the plane, which is created by the side-delimiting area 46, set back with a measure H3 of $0.03 \text{ mm} \leq H3 \leq 0.5 \text{ mm}$. The areas 74, 76, which run concave relative to the side-delimiting area 46, have a deflection radius R2 of $0.3 \text{ mm} \leq R2 \leq 2.0 \text{ mm}$, and the sections continuing convex have a deflection radius R1 of $0.3 \text{ mm} \leq R1 \leq 2.0 \text{ mm}$. The distance between the channel-like depressions 74, 76 is equal to T at $0.4 \text{ mm} \leq T \leq 3.0 \text{ mm}$.

If in the embodiments of FIG. 5 through 9 it is provided that the median area B is structured, then according to FIG. 10 a profiling of the carrier 34 and/or its side-delimiting area 46 is achieved in that the median area B is formed evenly, onto which the areas A connect, which have a profiling 78, 80. The areas A are then delimited by the peripheral areas C, which in turn do not have a profiling.

Independently thereof, a symmetry basically exists relative to the centerline of the delimiting area 46, where the profiling and/or structure of the side-delimiting area 46 of carrier 34 run. This is, however, not a required characteristic.

FIG. 11 therefore shows that in a median area, depressions 82, 84, 86, 88, 90, which run in the shape of grooves, are formed in the side-delimiting area 46 of the carrier 34, which have distances $T_1$ and/or $T_2$, which are different in relation to each other. The depressions run independently thereof, which run set back in relation to the side-delimiting area 46 with a measurement H4 of $0.03 \text{ mm} \leq H4 \leq 0.5 \text{ mm}$, in its median area so that the peripheral areas have no profiling.

FIG. 12 shows a specially shaped sawtooth profiling, which protrudes beyond the side-delimiting area 46 of the carrier 34 with a measure H5 of $0.03 \text{ mm} \leq H5 \leq 0.5 \text{ mm}$. In this the sawtooth-type protrusions 92, 94 are separated in groups, which have edges 96, 98 that are turned toward each other. Between the groups of sawtooth-shaped protrusions 92, 94 runs a protrusion 100, which in the sectional view forms a triangle, and which in the preferred version is intersected by the center line of the side-delimiting area 46.

The angle of inclination of the sawtooth-shaped protrusions 92, 94 is runs $\alpha_1$ in regards to the precipitous flank 102 with $0° \leq \alpha_1 \leq 30°$, and $\alpha_2$ in regards to the flat sloping flank 104 with $30° \leq \alpha_2 \leq 120°$.

The profilings and/or structures of the side-delimiting area 46 of the carrier 34, which are found in FIG. 5 through 12, can be designed according to the side-delimiting area 44 of the side slide 42.

The profilings and/or structures of the side-delimiting area 46 can of course run throughout the entire area rather than only sectionally. An embodiment is shown in FIG. 18 by way of example, in which the structure covers the entire area of the delimiting element 46. The distance T between the depressions is equal to $0.4 \text{ mm} \leq T \leq 3.0 \text{ mm}$ and the angle $\alpha$ of the side arms of the elevations and/or depressions, which normally has a triangular geometry, is in the preferred version equal to $30° \leq \alpha \leq 120°$.

In order to avoid that a gap forms between the carrier 30, which is adjustable along the sonotrode head 30, and the area 106, which is turned to the sonotrode head 30, where stranded wires can enter, which could negatively affect the movement of the carrier 34 along the double arrow 48 during the lowering of the anvil 32, it is possible to form a structure and/or profiling of the areas that are turned toward each other, which is the area 106 of the sonotrode head 30 and the side-delimiting area 46 of the carrier 34, as can be seen in FIG. 13. Here the delimiting area 46 of the carrier 34 has in the sectional view triangular protrusions 108, 110, which in the sectional view enter with a clearance into triangular depressions 112, 114 in the side area 106 of the sonotrode head 30, therefore forming a quasi labyrinth seal, which prevents stranded wires from entering.

The structure of not only the welded areas 36, 38, but also the side-delimiting area 44, 46 of the side slide 42 and the carrier 34, which receives the anvil 32, has the advantage that also during the joining of hard to weld stranded wires a high quality linking joint can be produced, whereby a positive energy transfer takes place at desired pressures. The weldable material is less damaged. A more precise energy input is also possible in relation to the designed structure.

It should be noted that the areas of the sonotrode and/or of the anvil that delimit the compression space can have the same profiling and/or structure as the side-delimiting areas.

FIG. 14 through 18 shall serve to illustrate another preferred development of the sonotrode 16, which should not be understood to limit the protection, however. The sonotrode 16 is illustrated in FIG. 14 in finite element calculation. The sonotrode 16 commonly consists of a base component 116 and the sonotrode head 30 originating from same, which in turn has the in FIG. 2 through 4 illustrated work areas or welding areas 36. The sonotrode head 30 has another work area or welding area 118, which is diametrically opposed, so that the sonotrode 16 is turned along its longitudinal axis in order to assign one of the work areas 36, 118 to the compression space 18. The longitudinal axis of sonotrode 16 moreover runs parallel to the Z-axis.

The work- or welding areas 36, 118 are delimited by an abutting face 120 of the sonotrode head 30, which proceeds vertically to the work areas 36, 118 when the sonotrode 16 is not stimulated. In the embodiment, the abutting face 120 runs parallel to the Y-axis and therefore the work area 36 and/or 118 proceeds vertical to the Y-axis when the sonotrode 16 is not stimulated.

During the welding process, the sonotrode 10 is not only deflected in the longitudinal Z-axis of the sonotrode but also in the direction Y, which causes a sloping of the work area 36, 118 (angle α). This may affect the quality of the weld. Depending on the deflection of the sonotrode head 30 in Y-axis, this may negatively affect the reproduction capabilities of the welding results.

In order to prevent drawbacks, the sonotrode head 30 can have a bracing that originates from its abutting face 120, whereby the deflection of the sonotrode 16 is reduced in Y-axis. The bracing 122 causes the deformation of the sonotrode head 30 to be decreased and/or limited in its Y-axis so that the self-oscillation of sonotrode 16 is improved.

According to FIG. 16 through 18, where the reference signs of FIGS. 14 and 15 are used for similar elements, the bracing 122 can be realized in that a corrugation 124 protrudes from the abutting face 120, which may commonly have a triangular geometry (FIG. 17) or a curved geometry (FIG. 16). The bracing in FIG. 17, which commonly has a triangular geometry, is denoted with the reference mark 122 and the curved geometry is according to FIG. 16 denoted with the reference mark 126. In this the cross-sectional views particularly show that the particular bracing 122, 126 rises from the particular work area 36, 118 and protrudes beyond the abutting face 120, whereby the maximum length lies in z-axis at the intersection with the central axis 130 of the sonotrode 16.

The maximum protrusion d of the bracing 122, 126 above the abutting face 120 of the sonotrode head 30 should be 15 mm, although other dimensions may be considered depending on the design of the sonotrode. Although a protrusion d of no more than 15 mm has the advantage that particular sonotrodes can be installed in ultrasonic welding apparatuses that are already in operation.

The bracing 122, 126 should be particularly designed so that the deflection in Z-axis of the sonotrode 16 acts relative to the deflection of sonotrode 16 in Y-axis like $3 A_z \leq A_{z/} A_y \leq 20$.

If in the embodiments the bracing 122, 126 runs throughout the entire elevation of the sonotrode head 30, there exists the possibility that the bracing, for example, proceeds at the center of the abutting face 120, therefore detached from the work areas 136, 118. Other geometries are alternatively possible.

Furthermore, the back side of the outer section of the sonotrode head 30, which has the work areas 36, 118, may have one or more bracings, whereby the bracing that proceeds along the abutting face may be eliminated, if need be. If the bracing runs at the back side, then the areal expanse of the interior section of the sonotrode head is smaller than the areal expanse of the outer section, which has at least one work area 36, 118.

The invention claimed is:

1. Ultrasonic welding apparatus for the welding of metal conductors, comprising a compression chamber delimited by:
   two opposite work surfaces, including a first work surface which is a part of a sonotrode of the ultrasonic welding apparatus and is constructed and arranged to be placed in ultrasonic oscillation, and a second work surface which is a part of a counter electrode of the ultrasonic welding apparatus, and
   two opposite side-delimiting surfaces extending transversely to the work surfaces, and which are displaceable relative to each other,
   at least one of the side-delimiting surfaces being three-dimensionally structured over at least a portion thereof.

2. Ultrasonic welding apparatus according to claim 1, wherein each of the side-delimiting surfaces is structured.

3. Ultrasonic welding apparatus according to claim 1, wherein the structured surface is in the form of channel-like or furrow-like depressions and/or corrugated elevations or protrusions, which run substantially parallel to each other and substantially vertically to a longitudinal axis of the compression space.

4. Ultrasonic welding apparatus claim 1, wherein the structure of the structured side-delimiting surface is formed by depressions which are set back relative to a plane that is created by the side-delimiting surfaces.

5. Ultrasonic welding apparatus claim 1, wherein the structure of the structured side-delimiting surface is formed by protrusions which protrude relative to a plane that is created by the side-delimiting area.

6. Ultrasonic welding apparatus claim 1, wherein the structure of the structured side-delimiting surface is formed by elevations and/or depressions in at least one area of the side-delimiting surfaces, the elevations and/or depressions running across in relation to a longitudinal axis of the the compression space.

7. Ultrasonic welding apparatus claim 6, wherein the elevations and/or depressions have a cross-section in form of a triangle, a trapezoid or the segment of a circle.

8. Ultrasonic welding apparatus claim 6, wherein the elevations and/or depressions form a structure having a wave-like geometry in section.

9. Ultrasonic welding apparatus according to claim 8, wherein the structure runs evenly over the side-delimiting surfaces.

10. Ultrasonic welding apparatus according to claim 1, wherein the at least one side-delimiting surface is structured in a central area and constructed evenly outside of the central area.

11. Ultrasonic welding apparatus according to claim 6, wherein the elevations and/or depressions are reciprocally spaced at a substantially constant distance.

12. Ultrasonic welding apparatus according to claim 6, wherein the elevations and/or depressions vary along the side-delimiting surfaces.

13. Ultrasonic welding apparatus according to claim 6 wherein the elevations and/or depressions form a sawtooth-like structure.

14. Ultrasonic welding apparatus according to claim 13, wherein the elevations having a sawtooth-like geometry are positioned in groups such that edges of the elevations are turned toward each other.

15. Ultrasonic welding apparatus according to claim 1, wherein the counter electrode originates from a carrier running along a side of the sonotrode and substantially vertically in relation to the work surfaces of the sonotrode, and a side face of the counter-electrode, which is exposed to the compression space, is a side-delimiting surface or one from which a plate-shaped element originates, which has on an outside portion a delimiting surface, and the delimiting surface has a structure which supplements a side of the sonotrode.

16. Tool for an ultrasonic welding apparatus according to claim 1, in a form of a side slide or a carrier of a counter electrode, wherein the tool with one area as side-delimiting surface defines the compression space, and wherein the side-delimiting surface is structured.

17. Tool according to claim 16, wherein the structured surface is in the form of channel-like or furrow-line depressions and/or corrugated elevations or protrusions, which run substantially parallel to each other and substantially vertically in relation to a longitudinal axis of the compression space.

18. Tool according to claim 17, wherein the side-delimiting surface is formed by the depressions which are set back in relation to a plane created by the side-delimiting surface.

19. Tool according to claim 16, wherein the side-delimiting surface has a structure formed through protrusions which protrude a the plane created by the side-delimiting area.

20. Tool according to claim 16, wherein the side-delimiting surface has a structure formed by elevations and/or depressions in at least one area of the side-delimiting area, the elevations and/or depressions running across as well as vertically to a longitudinal axis of the the compression space.

21. Tool according to claim 20, wherein the elevations and/or depressions have a cross-section in form of a triangle, a trapezoid or the segment of a circle.

22. Tool according to claim 20, wherein a structure is formed by the elevations and/or depressions has generally a wave-like geometry.

23. Tool according to claim 22, wherein the structure runs evenly across the side-delimiting surface.

24. Tool according to claim 16, wherein the side-delimiting surface is structured in a central area and formed evenly outside of the central area.

25. Tool according to claim 20, wherein the elevations and/or depressions are spaced at a substantially constant distance.

26. Tool according to claim 20, wherein the elevations and/or depressions vary along the side-delimiting surfaces.

27. Tool according to claim 20, wherein the elevations and/or depressions form a sawtooth-like structure.

28. Tool according to claim 27, wherein the elevations having a sawtooth-like geometry are positioned in groups such that edges of the elevations are turned toward each other.

29. Tool according to claim 16, wherein the counter electrode originates from a carrier running along a side of the sonotrode and substantially vertically in relation to the work surfaces of the sonotrode, and a side face, which is exposed to the compression space, is a side-delimiting area or from which a plate-shaped element originates, which has on an outside portion a delimiting surface, and wherein the delimiting surface is formed to supplement a side of the sonotrode.

* * * * *